United States Patent [19]
Bertram et al.

[11] Patent Number: 5,164,654
[45] Date of Patent: Nov. 17, 1992

[54] SOLAR ENERGY OPERATED AUTOMATIC CHARGE DEVICE FOR ELECTRIC APPLIANCES

[75] Inventors: Leo Bertram, Stolberg, Fed. Rep. of Germany; Hugo Schemmann, Schaesberg, Netherlands; Theodor Husgen, Aachen, Fed. Rep. of Germany

[73] Assignee: U.S. Philips Corporation, New York, N.Y.

[21] Appl. No.: 491,147

[22] Filed: Mar. 9, 1990

[30] Foreign Application Priority Data

Mar. 25, 1989 [DE] Fed. Rep. of Germany ....... 3909895

[51] Int. Cl.⁵ .............................. H02J 9/00; H02J 7/00
[52] U.S. Cl. ........................................... 320/61; 320/1; 320/21; 323/906
[58] Field of Search ................. 320/2, 61, 14, 1, 21, 320/32; 323/906

[56] References Cited

U.S. PATENT DOCUMENTS

| | | | |
|---|---|---|---|
| 4,134,057 | 1/1979 | Portmann | 320/61 |
| 4,434,395 | 2/1984 | Higuchi | 320/1 |
| 4,847,546 | 7/1989 | Bobier et al. | 320/21 |
| 4,963,811 | 10/1990 | Weber | 320/14 X |

*Primary Examiner*—R. J. Hickey
*Attorney, Agent, or Firm*—Bernard Franzblau

[57] ABSTRACT

A charging device for accumulator-operated small electrical appliances, for example, electric dry-shavers, which are energized by rechargeable accumulators (24) which can be charged by means of a charging device (15) including solar cells (11). The charging device includes an energy buffer (20) which is connected parallel to the solar cells for buffering the solar energy when the charge capacity of the solar cells is below the charge current threshold of the accumulator. The buffered solar energy is supplied to the accumulator when a discharge current of the energy buffer exceeds the charge current threshold of the accumulator and flows until the discharge current falls below the charge current threshold.

20 Claims, 3 Drawing Sheets

SOLAR ENERGY OPERATED AUTOMATIC CHARGE DEVICE FOR ELECTRIC APPLIANCES

BACKGROUND OF THE INVENTION

This invention relates to a solar operated charging device for a rechargeable accumulator, more particularly for small electrical apparatuses such as, for example, electric dry-shavers whose energy is supplied by rechargeable accumulators which can be charged by means of a charging device comprising solar cells.

Such a charging device is known from DE-OS 36 41 978. The outer side of a dry-shaver is provided with a solar cell module which is directly connected to the accumulators. In order to obtain a sufficient charge current, the solar cell surface is dimensioned as large as possible, particularly by folding out additional sheets of solar cells. However, particularly when nickel-cadmium accumulators are used, the direct charging is difficult because the currents supplied by the solar cell module in the case of cloudy weather or in winter become so small that they fall below the minimum charge current values (charge current threshold) of approximately one thirtieth of the accumulator capacity as stated by the accumulator manufacturers. For example, a minimum permanent charge current of 20 mA is permissible at a capacity of 600 mAh of a nickel cadmium accumulator. Smaller accumulator capacities, which could be operated with smaller charge currents, are not suitable because the accumulator would run down too fast if it were not recharged.

The solar current supplied by the solar cell module depends on the active surface area of the solar cells and on the amount of sunshine. The surface area of the solar cell module is limited by the dimensions of the apparatus so that a minimum value can be determined for the amount of sunshine which can be collected. If the active surface area is approximately 40 cm$^2$, the required minimum solar radiation for currently used solar cell modules is approximately 36,000 Lx for charging these accumulators at a rated voltage of 2.4 V. Dependent on cloudiness, location and light transmissiveness of the window glass, this value is not achieved for longer periods during the winter season so that the apparatus cannot be recharged at all because the currents supplied by the solar cell module are too small. On the other hand, the accumulator could be supplied with the energy for one shave, i.e. approximately 360 Ws, in approximately 4 hours by means of a current of 10 mA. Even smaller currents would still lead to a longer available shaving time without an additional charge from the mains.

The book "Gerätebatterien" by H. A. Kiehne et al, Expert Verlag, Vol. 104, Kontakt & Studium, Elektrotechnik, page 50 states the feasibility of improving the charge capability of accumulators at very small charge currents or of developing new circuits for converting small charge currents into stronger current pulses.

SUMMARY OF THE INVENTION

An object of the invention is to provide a charging device of the type described in the opening paragraph with which an accumulator can also be charged when the solar radiation is no longer sufficient to supply the minimum current required for charging.

According to the invention, this object is achieved in that the charging device comprises an energy buffer which is arranged parallel to the solar cells for buffering the charge capacity of the solar cells when the charge capacities of the solar cells are below the charge current threshold of the accumulators, and for supplying the buffered solar energy to the accumulators when the discharge current, which is adjusted upon discharge of the energy buffer, exceeds the charge current threshold of the accumulators until the charge capacities fall below the charge current threshold again.

The charge capacity of the solar cells is thus first accumulated and then supplied to the accumulator when the charge current is sufficient for charging the accumulator. Thus, the device for charging the accumulator can also be used in the case of poor light conditions and a solar cell module current which is below the current required for immediate charging. Consequently, the solar cells can be used for recharging for a considerably longer time than is possible without any buffer storage.

In accordance with a further embodiment of the invention the energy buffer comprises at least a capacitor. Capacitors are very suitable as energy buffers because they are inexpensive and can easily be accommodated in the housings of electrical appliances. The charging device has a particularly small construction if, in accordance with a further embodiment of the invention, the energy buffer comprises at least an additional accumulator having a relatively small charge capacity.

In accordance with a further embodiment of the invention, the charging device comprises a switching device for connecting the energy buffer to the accumulator for supplying the charge capacity when the buffered or directly supplied charge capacity is sufficiently large to exceed the charge current threshold and for disconnecting the energy buffer and the accumulator in the case of unfavourable weather conditions when the charge current for the accumulator does not reach the charge current threshold, as a result, the energy buffer can be charged by the solar cell module for a pulsatory charging of the accumulator. The switching device thus ensures that the energy buffer, be it a capacitor or an accumulator having a small charge capacity, is charged in the case of poor light or unfavourable weather conditions and low solar radiation values and that subsequently the energy stored therein is supplied to the accumulator in a pulsatory manner and in the form of energy packets. If the charge currents of the solar cell module exceed the threshold value of the charge capability of the accumulator, the switching device passes on the solar energy to the accumulator. A blocking diode in series with the solar cell module prevents the current from returning.

In accordance with a further embodiment of the invention, the switching device includes a voltage-dependent switch for controlling a switching transistor in the charge current circuit, and dependent on the voltage state at the energy buffer.

In a capacitor, a measure of the power supplied to the energy buffer is the capacitor charge voltage $U_C$, which is proportional to the capacitor charge and inversely proportional to the capacitance. The accumulator charge current is determined by the difference between the capacitor voltage and the accumulator voltage as well as by the resistances in the circuit, whereby the internal resistance of the accumulator is very small. The capacitor voltage thus has a decisive influence on the current provided that the other influential values do not change to such a considerable extent. If an additional accumulator is used as an energy buffer, the same applies analogously to the series accumulator voltage. Together with the recharging of the solar cells, the voltage variation between the connection and disconnection of the buffer determines the clock frequency of the arrangement. The solar cells should be constructed in such a way that, also in unfavourable weather conditions, they can charge the buffer to a voltage which is sufficiently large to charge the accumulator with the required current so as to counteract its voltage in the charged state in the no-load condition and the voltage drops in the switching circuit.

In accordance with a further embodiment of the invention the voltage-dependent switch is a hysteresis Schmitt trigger or a window discriminator having adjustable threshold values. A Schmitt trigger is a very simple electronic element and a window discriminator provides more possibilities for a precise control of the switching transistor.

In accordance with a further embodiment of the invention the charging device comprises an additional auxiliary battery for ensuring the voltage supply of the voltage-dependent switch. The control unit is then independent of the charge status of the accumulator.

In accordance with a further embodiment of the invention the charging device comprises an up-converter circuit for ensuring the voltage supply of the voltage-dependent switch, said up-converter circuit raising the voltage from the accumulator to the level required for operation. In this embodiment an auxiliary battery is not necessary.

In accordance with a further embodiment of the invention a driver stage is arranged between the voltage-dependent switch and the switching transistor. The switching transistor can then also supply a higher control power.

In accordance with a further embodiment of the invention the switching transistor is a bipolar transistor, a Darlington transistor or a field effect transistor.

In accordance with a further embodiment of the invention the switching transistor is controlled as a function of the voltage at the energy buffer as well as the charge current of the accumulator. This ensures that the charge current circuit is no longer interrupted if the solar current is sufficiently large.

In accordance with a further embodiment of the invention the switching device comprises two voltage-dependent switches, one switch being controlled by the voltage at the energy buffer and the other being controlled by a charge current-dependent voltage which is taken from a limiting resistor in the charge current circuit, the two switches setting or resetting a bistable multivibrator for controlling the switching transistor in the charge current circuit. The switching criteria can then be detected satisfactorily.

BRIEF DESCRIPTION OF THE DRAWING

The invention will now be described in greater detail, by way of example, with reference to the accompanying drawings in which.

DESCRIPTION OF THE PREFERRED EMBODIMENTS

Figure 1:
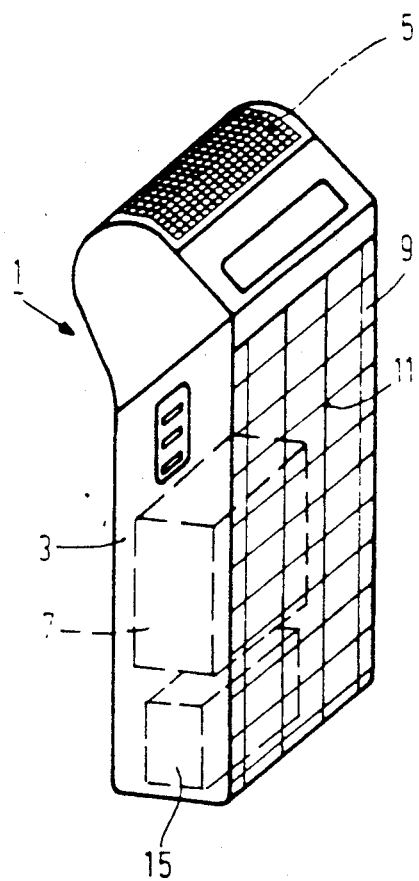
FIG. 1 shows an example of an electric dry-shaver including a solar charging device with which the accumulators can be charged, even at lower charge currents.

FIG. 1 shows diagrammatically an electric dry-shaver 1 having a housing 3 and a shaving head 5. The housing 3 accommodates a rechargeable accumulator 7, which is shown in broken lines and which feeds the motor (not shown) for driving the shaving head.

To charge the accumulator 7, a solar cell module 11 is arranged on a side wall 9. The accumulator 7 is charged by means of the solar cell module 11 via a charging device 15.

Figure 2:
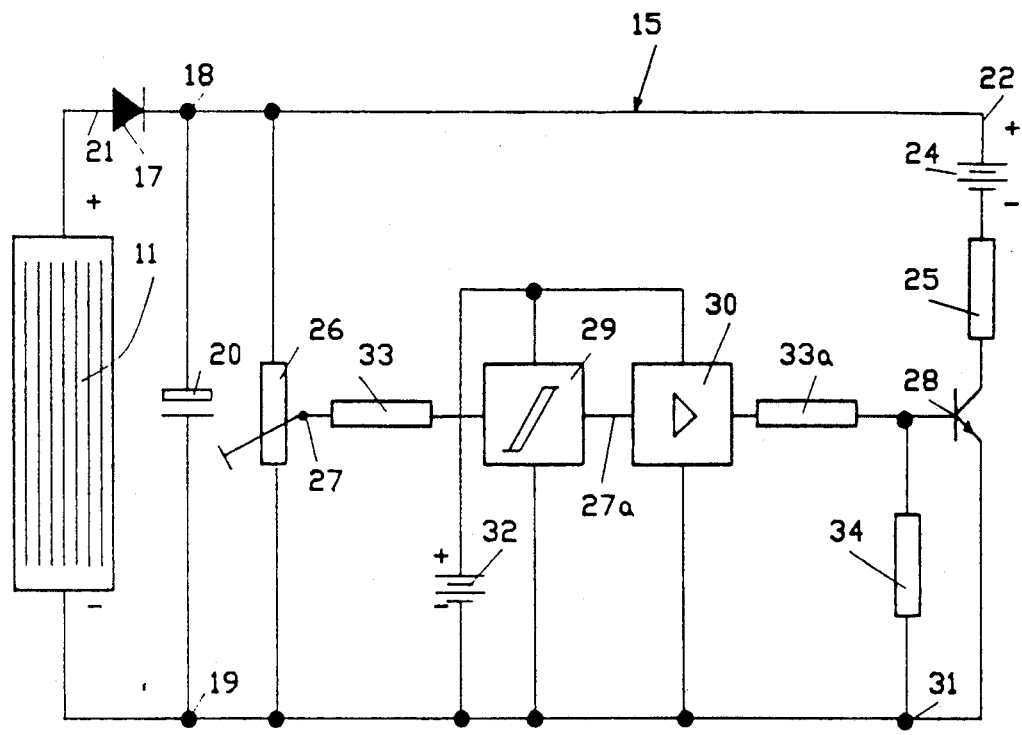
FIGS. 2, 3 and 4 show different circuit diagrams of charging devices for the electric dry-shaver of FIG. 1.

The charging device 15 is shown by way of a basic circuit diagram in FIG. 2. With the interposition of a diode 17 the solar cell module 11 is connected to the terminals 18, 19 of an electrolytic capacitor 20 having a capacitance C. The diode 17 is arranged in the positive connection of the solar cell module. The terminals 18, 19 are connected to the positive terminal 22 of a rechargeable accumulator 24 and to the emitter of the switching transistor 28, respectively. Arranged in series with the accumulator 24 is a resistor 25 for limiting the current and adjustment of the charge time constant $\tau = R.C.$, in which R is the sum of all of the resistances of the charge current circuit.

A potentiometer 26 for determining the charging threshold is arranged parallel to the electrolytic capacitor 20 and between the terminals 18 and 19. Its adjustable tapping 27 is connected to the control input of a Schmitt trigger 29 via a limiting resistor 33.

The output of the Schmitt trigger 29 is connected to a driver stage 30 via a signal line 27a, which stage operates as an amplifier for controlling the switching transistor 28. The output of the amplifier 30 is connected to the base of the switching transistor 28 via a limiting resistor 33a. An auxiliary battery 32 supplies the voltage for the two electric components 29 and 30. A leakage resistor 34 connects the base of the switching transistor to the terminal 31 conveying the negative solar cell potential.

Figure 3:
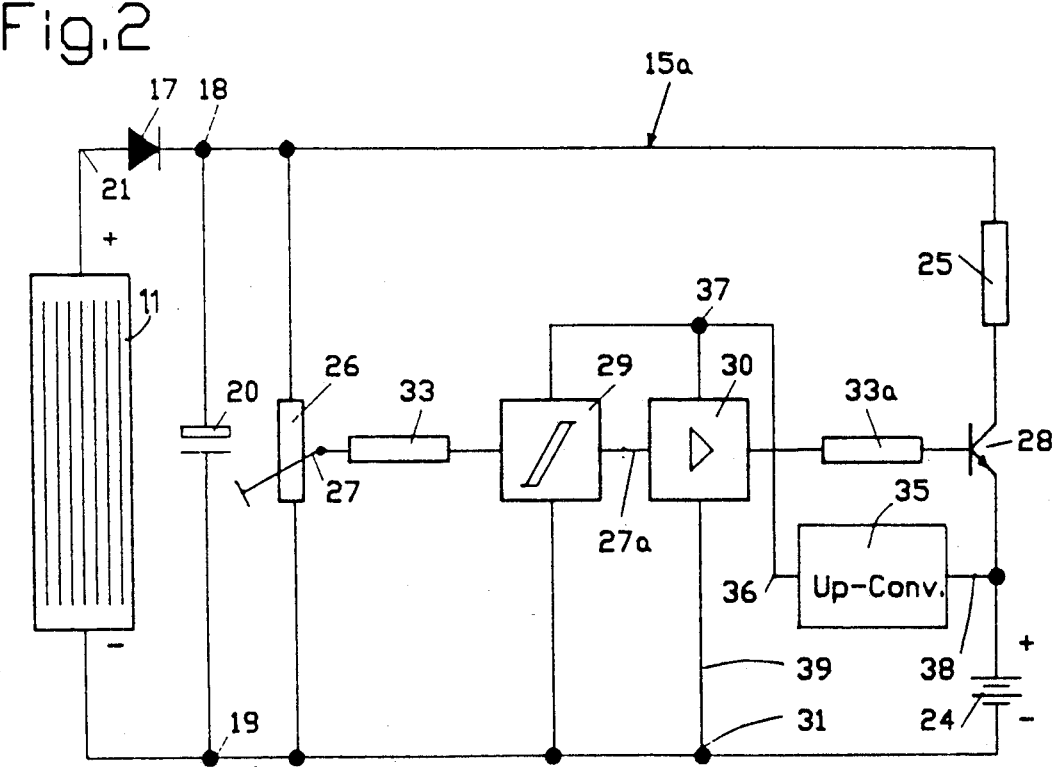

Another charging device 15a is shown in FIG. 3. The auxiliary battery of FIG. 1 is replaced by an up-converter circuit 35 which supplies the Schmitt trigger 29 and the driver stage 30 with the required voltage. The electrical energy is taken from the accumulators 24, supplied via the connections 38, 39 of the up-converter circuit and brought to the desired voltage level of the components 29, 30.

The charging device operates as follows. If the charge current $i_1$ from the solar cell module 11 is so large that it provides the storage capacitor 20 with a voltage such that the charge current threshold of the accumulator 24 is exceeded, the Schmitt trigger 29, the driver stage 30 as well as the transistor 28 close the charge current circuit between the capacitor 20 and the accumulator 24. To this end the driver stage 30 raises the base of the switching transistor 28 to such a potential that the transistor 28 is turned on. If the charge current $i_1$ from the solar cell module 11 drops below the admissible limit value, the switching transistor is turned off via the electronic components 29, 30. The charge current $i_1$ from the solar cell module 11 then only flows into the capacitor 20 and charges this capacitor. If the stored charge capacity in the capacitor 20 is sufficiently large so that the charge current threshold of the accumulator 24 is exceeded, the switching transistor 28 closes the charge current circuit between the capacitor 20 and the accumulator 24 in response to a signal supplied by the Schmitt trigger 29 and amplified by the driver stage 30.

Figure 4:
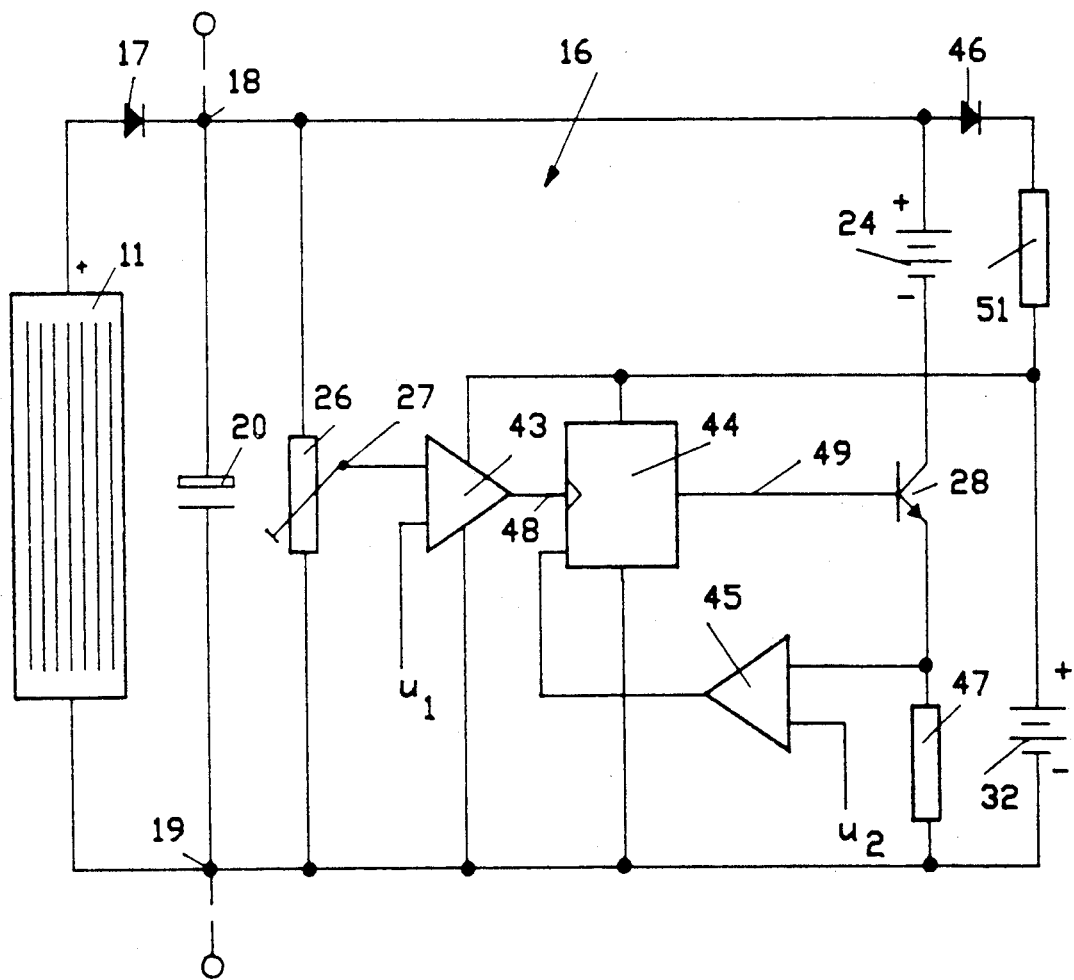

In the embodiment of the charging device of FIG. 4 the charge of the capacitor 20 additionally charges the accumulator 24 via the transistor 28 and a limiting resistor 47 when the charge voltage at capacitor 20 is exceeded. The additional charging is to start when the voltage at the tapping 27 of the potentiometer 26 exceeds a threshold value which is adjustable by means of a comparison voltage U1, and switches a comparator 43. As a result of switching the comparator 43 a bistable multivibrator (flipflop) 44 is set. The output of flip-flop 44 is connected to the base of the switching transistor 28 and thus turns on the transistor 28. Furthermore, the charge current of the accumulator 24 is measured at the current limiting resistor 47 and is compared with the comparison voltage U2 at a second comparator 46. When the charge current of the accumulator 24 drops below its permissible value, the flipflop 44 is reset by switching the comparator 45 and in turn interrupts the charge current circuit of the accumulator 24 via the switching transistor 28.

The charge current will not be interrupted when the solar cell 11 supplies sufficient charge current so that the lower threshold of the charge current does not fall below its permissible value.

The auxiliary battery 32 is additionally charged when the voltage at the energy buffer 20 exceeds the sum of the voltage at the auxiliary battery 32 as well as the voltage drops across the limiting resistor 51 and the diode 46. The auxiliary battery 32 ensures the voltage supply of the control elements 43, 44 and 45 when the voltage at the energy buffer 20 is no longer sufficient for this purpose.

All embodiments enable the energy buffer 20 and the accumulators 24 and 32 to be additionally charged via the terminals 18, 19. FIG. 4 shows the terminals for additional charging by means of broken lines.

We claim:

1. A charging device for small electrical appliances whose energy is supplied by a rechargeable accumulator comprising: solar cells for converting light energy into an electric solar cells voltage, an energy buffer for storing electric energy thereby to develop a buffer voltage indicative of the amount of electric energy stored, first means responsive to the solar cells voltage and to the buffer voltage for coupling the energy buffer in parallel with the solar cells for buffering the solar energy if the solar cells voltage is equal to or greater than the buffer voltage and independently of the accumulator voltage, and second means controlled by the buffer voltage and a given threshold voltage for coupling the accumulator in parallel with the energy buffer for supplying the buffered solar energy to the accumulator if the buffer voltage exceeds the given threshold voltage and independently of the solar cells voltage.

2. A charging device as claimed in claim 1 wherein the energy buffer comprises at least an additional accumulator having a relatively small charge capacity.

3. A charging device as claimed in claim 1, wherein the second coupling means comprises a swtching device for connecting the energy buffer to the accumulator for supplying a charge current to the accumulator when the buffered or directly supplied energy is sufficiently large to exceed a charge current threshold of the accumulator and for disconnecting the energy buffer and the accumulator when the charge current for the accumulator does not reach the charge current threshold, whereby the energy buffer produces a pulsatory charging of the accumulator.

4. A charging device as claimed in claim 1 wherein the second coupling means comprises a switching transistor connected in series with the accumulator and also comprises a switching device which includes a voltage-dependent switch for controlling the switching transistor dependent on the buffer voltage.

5. A charging device as claimed in claim 4, wherein the voltage-dependent switch comprises a hysteresis Schmitt trigger or a window discriminator having adjustable threshold values.

6. A charging device as claimed in claim 4 which further comprises an auxiliary battery for supplying an operating voltage to the voltage-dependent switch.

7. A charging device as claimed in claim 4 which further comprises an up-converter circuit coupled to the accumulator for supplying an operating voltage to the voltage-dependent switch, said up-converter circuit raising the accumulator voltage to a level required for operation of the voltage-dependent switch.

8. A charging device as claimed in claim 4, wherein the switching device is responsive to the buffer voltage and to a charge current for the accumulator thereby to control the switching transistor in dependence on the buffer voltage and on the accumulator charge current.

9. A charging device as claimed in claim 1 wherein the second coupling means comprises a switching transistor connected in series with the accumulator and a switching device which includes two voltage-dependent switches, one switch being controlled by the voltage at the energy buffer and the other switch being controlled by a charge current-dependent voltage derived from a resistor in a charge current circuit of the accumulator, the two switches setting and resetting a bistable multivibrator for controlling in turn the switching transistor.

10. A device for charging a rechargeable accumulator from a source of solar energy comprising:
a solar cell arrangement for converting light energy into an electric solar cell voltage,
an energy buffer for storing electric energy thereby to develop a buffer voltage which is indicative of the amount of stored electric energy,
a switching device for coupling the solar cell arrangement in parallel with the energy buffer when said electric solar cell voltage is equal to or greater than the buffer voltage, and
switching means for coupling the rechargeable accumulator in parallel with the energy buffer when the buffer voltage exceeds a predetermined threshold voltage.

11. A charging device as claimed in claim 10 wherein the energy buffer comprises at least a capacitor and said switching means is controlled only as a function of the buffer voltage.

12. A charging device as claimed in claim 10, wherein the switching means comprise:
a switching transistor connected in series with the accumulator and having a control electrode;
a voltage-dependent switch for deriving a voltage sense signal in response to a voltage difference between at least a fraction of the buffer voltage and a reference voltage; and
means for coupling the voltage sense signal to the control electrode of the switching transistor.

13. A charging device as claimed in claim 12, wherein the voltage-dependent switch comprises a hysteresis Schmitt trigger having an input coupled to a tap of an adjustable potentiometer which is connected across the energy buffer.

14. A charging device as claimed in claim 12, further comprising an auxiliary battery for supplying power to the voltage-dependent switch.

15. A charging device as claimed in claim 12, further comprising an up-converter circuit coupled to the accumulator for supplying power to the voltage-dependent switch.

16. A charging device as claimed in claim 12, further comprising:
   means for converting a current flowing through the switching transistor to a voltage and means for deriving a current sense signal in response to said voltage and a further reference voltage, and
   means for combining the current sense signal and the voltage sense signal.

17. A charging device as claimed in claim 16, wherein the current to voltage converting means is a resistor connected in series with the switching transistor and wherein the combining means includes a bistable multivibrator having a toggle input coupled to the voltage sense signal and an enable input coupled to the current sense signal.

18. A charging device as claimed in claim 10 wherein the switching device comprises a diode connected between the solar cell arrangement and the energy buffer and polarized and connected so as to prevent the flow of current from the accumulator to the solar cell arrangement, and wherein said predetermined threshold voltage is related to a charge current threshold of the accumulator.

19. A charging device as claimed in claim 10 wherein the switching device is coupled to the solar cell arrangement and to the energy buffer and the switching means is controlled by the buffer voltage and by a source of predetermined threshold voltage.

20. A charging device as claimed in claim 10 wherein the energy buffer comprises at least a capacitor and the value of said predetermined threshold voltage is determined by a threshold value of a charge current for the accumulator.

* * * * *

UNITED STATES PATENT AND TRADEMARK OFFICE
CERTIFICATE OF CORRECTION

PATENT NO. : 5,164,654

DATED : NOVEMBER 17, 1992

INVENTOR(S) : LEO BERTRAM ET AL

It is certified that error appears in the above-indentified patent and that said Letters Patent is hereby corrected as shown below:

Column 2, line 39, change ", as" to --.  As--.

Claim 2, column 5, line 57, change "1" to --10--.

Signed and Sealed this

Twenty-second Day of March, 1994

Attest:

BRUCE LEHMAN

Attesting Officer

Commissioner of Patents and Trademarks